United States Patent [19]

Meadus et al.

[11] 3,984,287

[45] Oct. 5, 1976

[54] APPARATUS FOR SEPARATING ORGANIC MATERIAL FROM PARTICULATE TAR SANDS AND COAL AND AGGLOMERATION OF THE PARTICULATE RESIDUE

[75] Inventors: Frederick Weldon Meadus; Bryan D. Sparks; Ira E. Puddington, all of Ottawa, Canada

[73] Assignee: Canadian Patents and Development Limited, Ottawa, Canada

[22] Filed: June 30, 1975

[21] Appl. No.: 587,351

[30] Foreign Application Priority Data
Aug. 29, 1974  Canada .............................. 208138

[52] U.S. Cl. ........................ 196/14.52; 23/269;
23/270 R; 208/11 LE; 210/511
[51] Int. Cl.² ................. B01D 11/02; C10G 1/04
[58] Field of Search .......... 196/14.52, 155; 23/269, 23/270 R; 208/11 LE; 210/21, 511; 233/27, 28, 14 R, 3

[56] References Cited
UNITED STATES PATENTS

| 617,712 | 1/1899 | Bell .................................. 196/14.52 |
| 2,709,833 | 6/1955 | Wiklund ............................ 425/317 |
| 3,161,581 | 12/1964 | Tiedje et al. ..................... 196/14.52 |
| 3,854,658 | 12/1974 | Probstmeyer ..................... 233/14 R |

FOREIGN PATENTS OR APPLICATIONS
237,867 | 7/1926 | United Kingdom .................. 23/269

*Primary Examiner*—Morris O. Wolk
*Assistant Examiner*—Bradley Garris
*Attorney, Agent, or Firm*—Francis W. Lemon

[57] ABSTRACT

A rotatable drum having an interior which tapers in a horizontal direction has a first port at the smaller end for receiving particulate Tar Sands or coal, and an agglomerating liquid, e.g. water, and a second port at the larger end for receiving an organic material separating liquid, e.g. Varsol, with which the agglomerating liquid is immiscible. The first port is, for example, larger than the second port so that the separating liquid will drain from the drum through the first port. A conveying means delivers the particulate material and agglomerating liquid into the drum interior, and the separating liquid forms a slurry therewith so that inorganic residue from the particulate material is formed into ball agglomerates as it tumbles along the drum and the ball agglomerates overflow through the second port while the separating liquid fed into the second port separates organic material from the particulate material (Tar Sands) in the drum and overflows therewith through the first port.

7 Claims, 2 Drawing Figures

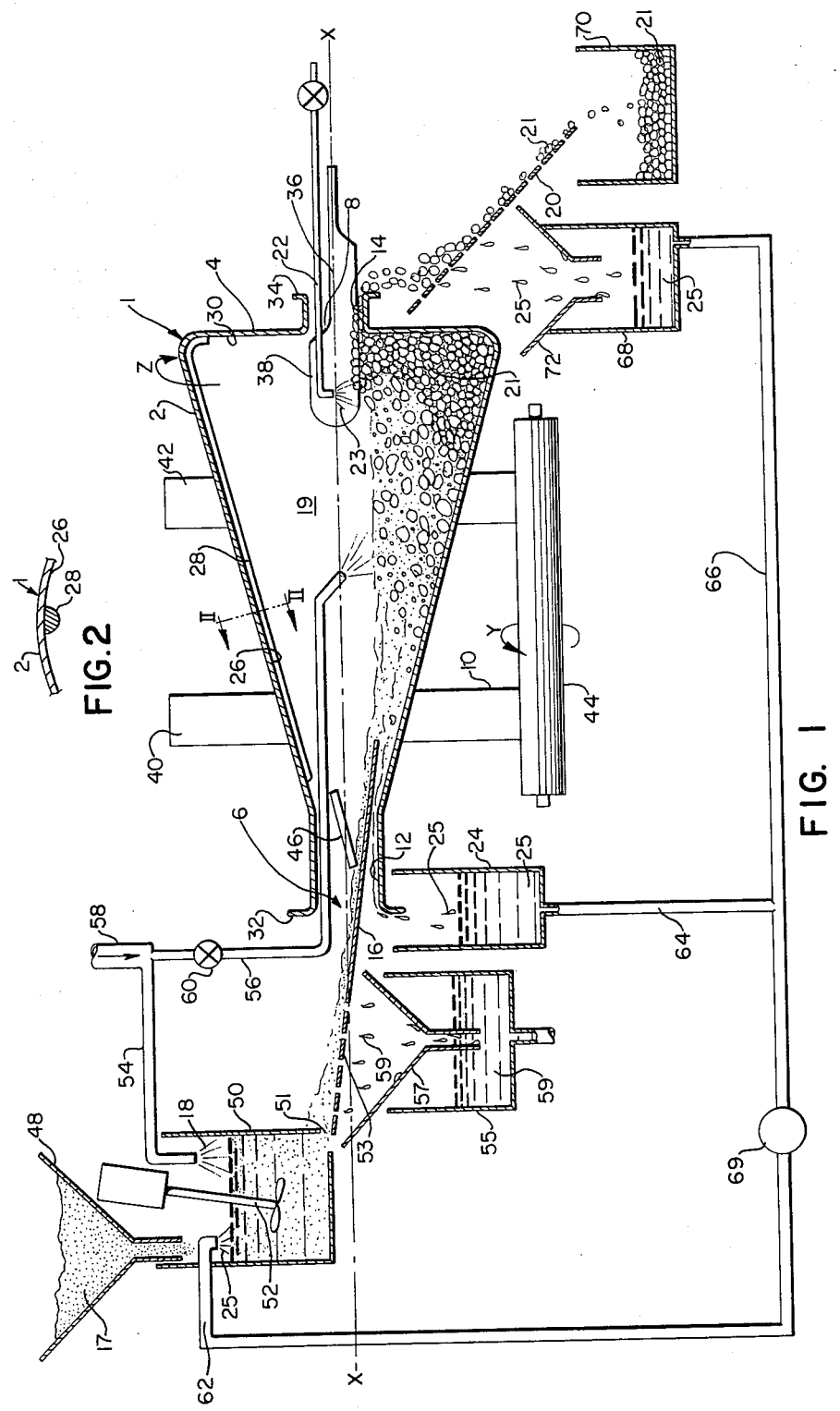

APPARATUS FOR SEPARATING ORGANIC MATERIAL FROM PARTICULATE TAR SANDS AND COAL AND AGGLOMERATION OF THE PARTICULATE RESIDUE

This invention relates to an apparatus for separating organic material from particulate Tar Sands and coal and agglomeration of the particulate residue thereof.

It has been proposed in U.S. Pat. No. 2,709,833, dated June 7, 1955, J. E. Wiklund, to use a rotating drum, having the form of a frustum of a cone, to pelletize pulverulent material. The apex end is positioned downwards so that the central axis of the cone forms a positive acute angle of inclination to the horizontal smaller than half of the apex angle of the cone. The drum is rotated about its central axis while being charged at the small end with fine-grained material to be pelletized. The fine-grained material rolls on the bottom of the drum in a direction from the apex of the cone and the larger the pellets thus formed the greater the tendency for the fine-grained material to move in this direction. The larger pellets collect at the wide end of the cone and are removed from this end of the drum.

Persons skilled in the art of pelletization or agglomeration have only considered using a rotating drum, having the form of a frustum of a cone, for the agglomeration of particulate material, and it has now been found, according to the present invention, that such rotating drums can be adapted to remove organic material from particulate Tar Sands and coal in a surprisingly efficient manner and agglomerate the residue to facilitate removal of the residue from a separating liquid.

It is an object of the present invention to provide an apparatus using a rotating drum, having the form of a frustrum of a cone, for the removal of organic material from particulate Tar Sands and coal and agglomeration of the residue to facilitate removal of the residue from a separating liquid.

Thus in contrast to the prior art an important feature of the present invention is that the apparatus is primarily used for the separation of organic material from particulate Tar Sands and coal, and that the agglomeration of the residue is used to assist this separation.

Thus the present invention is useful for separating bitumen from Tar Sands and organic material from coal.

According to the present invention there is provided an apparatus for separating organic material from Tar Sands and coal and agglomeration of the particulate residue, comprising:

a. a drum comprising a side wall which is annular in cross-section, with a substantial lengthwise portion of the cross-sectional area of the drum interior tapering in a horizontal direction, an end wall extending across a larger end of the drum interior, a first port at a smaller end of the drum interior, and a second port in the end wall and horizontally spaced from the first port, b. drum mounting and rotating means mounting the drum so that liquid will overflow from the drum interior through the first port, and for rotating the drum about the longitudinal axis thereof, c. conveying means, extending through the first port, for conveying the particulate material and a residue agglomerating liquid to an intermediate longitudinal portion of the drum interior, and d. liquid delivering means, for directing a a particulate material slurry forming and organic material separating liquid, with which the agglomerating liquid is immiscible, into a portion of the drum interior adjacent the second port.

In the accompanying drawings which illustrate, by way of example, embodiments of the present invention:

FIG. 1 is a schematic, sectional side view of an apparatus which is particularly useful for extracting bitumen from Tar Sands and agglomerating the particulate residue of clay and sands, and FIG. 2 is a sectional end view along II—II, FIG. 1 of a portion of a drum.

In FIG. 1 there is shown an apparatus for the removal of bituminous material from Tar Sands and agglomeration of the particulate residue thereof, (clay and sands), comprising:

a. a drum 1 comprising a side wall 2 which is annular in cross-section, with a substantial lengthwise portion of the cross-sectional area of the drum interior 19 tapering in a horizontal direction, an end wall 4 extending across a larger end of the drum interior 19, a first port 6 at the smaller end of the drum interior 19, and a second port 8 in the end wall 4 and horizontally spaced from the first port 6, b. drum mounting and rotating means, generally designated 10, which in this embodiment mounts the drum 1 with the periphery 12 of the first port 6 at a lower level than the periphery 14 of the second port 8, so that a separate liquid for bituminous material will overflow from the drum interior 19 through the first port 6, and for rotating the drum 1 about the longitudinal axis XX thereof so that residue agglomerates formed therein will overflow therefrom through the second port, c. conveying means 16 and 56 extending through the first port 6 for conveying Tar Sands 17 and a residue agglomerating liquid therethrough to an intermediate longitudinal portion of the drum interior 19, and d. liquid delivering means in the form of pipe 22 for directing a Tar Sands slurry forming and bitumen separating liquid 23, with which the residue agglomerating liquid is immiscible, into a portion of the drum interior 19 adjacent the second port 8.

In this embodiment, a perforate, agglomerate conveying means 20 is provided adjacent the outlet end of the second port 8 for conveying agglomerates 21 overflowing through the second port 8 from the drum interior 19.

Further, in this embodiment a liquid collecting means, in the form of vessel 24, is provided for collecting bitumen separating liquid 25 overflowing through the first port 6.

Referring to FIGS. 1 and 2 the side wall 2 of the drum 1 preferably has a plurality of ribs, one of which is shown and designated 28, spaced circumferentially therearound and extending along a major portion of the length of the drum 1. The ribs 28 preferably having rounded external surfaces as shown in FIG. 2. As already stated ribs 28 are circumferentially spaced around the drum 1 and extend radially inwardly at one end along a portion of the inside surface 30 of the end wall 4.

The first port 6 is neck-shaped and has an outer, annular flange 32 to direct the liquid 25 into the vessel 24. The second port 8, which in this embodiment is smaller in diameter than the first port 6, is neck-shaped and has an outer, annular flange 34 to direct the agglomerates 21 on to the screen 20. A stationary agglomerate collector 36 of arcuate cross-section is preferably secured in position to extend through the second port 8 and may rotate with the drum 1 or remain stationary. The collector 36 may be perforated with liquid drainage holes (not shown) and has a scoop extension 38 in the direction of rotation of the drum 1 for retaining agglomerates 21 that tumble on to the collector 36 as the drum rotates.

In this embodiment the drum mounting means 10 mounts the drum 1 for rotation with the axis XX extending horizontally and this is possible because the second port 8, being smaller in cross-section than the first port 6, provides a head so that liquid 23 can only flow by gravity out of the first port 6. If the second port 8 did not provide a head, for example, if the second port 8 was the same size as the first port 6, then the mounting means 10 would have to rotate the drum 1 with the axis XX inclined to the horizontal so that the head is provided by the second port 8 being at a higher level than the inlet 6. The drum mounting means 10 comprises two hoops 40 and 42 attached to the drum 1 and two rotatable supporting rollers, one of which is shown and designated 44. The supporting rollers are parallel and spaced apart, and at least one of them is driven, by means not shown, in the direction of arrow Y so that the drum 1 is rotated in the direction of arrow Z.

Baffles, such as that shown and designated 46, may be provided around the internal perimeter of the first port 6 of the drum 1, for rotation therewith, to convey Tar Sands 17 into the drum 1 and retard it from being carried out of the first port 6 with the liquid 25. In order to move Tar Sands 17 into the drum 1 the baffles such as 46 are inclined to the axis XX about which the drum 1 rotates, with the innermost ends of the baffles trailing the outermost ends when the drum 1 is rotated.

The conveying means 16 in this embodiment is a chute of arcuate cross-section extending into the drum 1 to deliver the Tar Sands 17 to an inclined portion of the side wall 2 adjacent the first port 6. In other embodiments the first conveying means 16 may be a pump, screw feed, or the like.

In this embodiment the Tar Sands 17 are fed from a hopper 48 into a mixing vessel 50 containing an agitating device such as stirrer 52. A portion of the agglomerating liquid 18 is sprayed from a pipe 54 into the mixing vessel 50 while another portion of the agglomerating liquid is sprayed as a trimming spray from a pipe 56 into the drum interior 19. Both of the pipes 54 and 56 are fed from a manifold 58, and valve means 60 is provided to obtain the appropriate delivery of agglomerating liquid from each of the pipes 54 and 56. Bitumen separating liquid is sprayed in the mixing vessel 50 from a pipe 62. The contents of the mixing vessel 50 exit therefrom as a slurry through an outlet 51, and flow over a screen 53 forming part of the conveying means 16. A collecting tank 55 and funnel 57 are positioned beneath the drainage holes in the screen 53 for collecting liquid 59 containing a high concentration of bitumen extracted from the Tar Sands, leaving drained Tar Sands to enter the drum 1. 17.

Further, in this embodiment the bitumen separating liquid 25, which has washed the Tar Sands 17, is sprayed into the mixing vessel 50 by means of a pipe 62. The pipe 62 is connected by a pipe 64 to the vessel 24 to convey liquid 25 therefrom to the mixing vessel 50. Also, liquid 25, which has been carried out of drum 1 through the second port 8, by the agglomerates 21, is conveyed from vessel 68 to vessel 50 via pipes 66 and 62. A pump 69 is provided in the pipe 62 to pump liquid 25 therealong.

A portion of the liquid 23 from pipe 38 washes the agglomerates 21 and it is a small portion of this liquid that is conveyed from the drum through the second port 8 with the agglomerates 21. The agglomerates 21 tumble down the screen 20 into a vessel 70, while the liquid 25 conveyed with the agglomerates 21 drains therefrom through the screen 20 into the vessel 68. The vessel 68 is provided with a funnel 72 to direct the droplets of liquid 25 into the vessel 68.

In operation, the drum 1 is rotated by the means 10, the stirrer 52 is operated, the Tar Sands 17 are fed from hopper 48 into the mixing vessel 50, agglomerating liquid 18, in this instance water preferably adjusted to about pH of 9.5 with for example NaOH, from manifold 58 is sprayed by pipes 54 and 56 into the mixing vessel 50 and drum 1 respectively, and bitumen extracting liquid, in this instance Varsol (trademark) is sprayed by pipe 22 into the drum 1.

As the drum 1 rotates the Tar Sands 17 enters the drum interior 19 through the first port 6 as a drained mass after having been mixed with the agglomerating liquid 18 in the mixing vessel 50 and drained on the screen 53, and tumbles along the drum interior 19 towards the second port 8 forming a slurry with the liquid 22 and then gradually agglomerating therein into substantially spherical agglomerates 21 which collect at the second port 8. The agglomerates collect at the second port 8 until they overflow on to the stationary, agglomerate collector 36 and are conveyed thereby through the second port 8 and tumble and cascade down the screen 21 into the vessel 70. Meanwhile, the liquid 23 sprayed from pipe 22 collects in the drum 1 until a portion of it begins to overflow out of the first port 6 as liquid 25 into the vessel 24 while another portion of it is conveyed by the agglomerates 21 through the second port 8 and drains through liquid drainage holes in the screen 21 into the vessel 68.

As previously stated, the liquid 23 contacts the Tar Sands 17 and agglomerates 21 and extracts bitumen component therefrom so that liquid 25 comprises the liquid with bitumen at least partially dissolved therein, and the agglomerates 21, passing through the second port 8 comprise mostly residual clays and sands and agglomerating liquid 18.

When a sufficient quantity of liquid 25 has collected in the vessels 24 and 68 the pump 69 is actuated to transport liquid 25 into the mixing vessel 50 where it is thoroughly mixed with the Tar Sands 17 therein to dissolve, peptize or remove, bitumen therefrom. The liquid 25 passes through the outlet 51 and drains from the Tar Sands 17 through liquid drainage holes in the screen 53 into the collecting vessel 55.

Circulating the liquid 25 through the mixing vessel 50 provides what is in effect a very efficient two stage extraction process because the fresh liquid 23 is used for a secondary washing in the drum 1 while the liquid 25 from this secondary washing is used for an initial washing in the mixing vessel 50.

The ribs 28 in effect provide a roughened inner surface for the drum 1 and retard the material 17, mixed with agglomerating liquid 18, from slipping around along the inside surface 26 of the drum 1 and aid the material 17, mixed with agglomerating liquid 18, in tumbling and cascading for spherical agglomeration. In other embodiments the drum may be provided with an inner roughened inner surface by longitudinally fluting the drum inner surface, or by providing a mesh lining on the inner surface.

While the collector 36 is not essential because the largest spherical agglomerates 21 will naturally pile up adjacent the end wall 4 and overflow through the second port 8, the collector 36 does expedite removal of the spherical agglomerates 21 and so facilitates a greater throughput of material 17 through the drum 1. When a collector 36 is used, preferably, the liquid spray 23 from pipe 22 is directed on to agglomerates 21 on the collector 36 as shown in FIG. 1. The baffles 46 in the first port 6 also, facilitate a greater throughput of material 17 through the drum 1.

The trimming spray of agglomerating liquid from the pipe 56 is useful for adjusting the agglomerating liquid content to the optimum amount for spherical agglomeration.

The liquid 59 in the tank 55 may be treated, for example by distillation, to remove the bitumen therefrom that has been extracted from the Tar Sands 17, and the recovered liquid may be fed to the mixing vessel 50 and/or fed to the pipe 22.

The agglomerates 21 in the vessel 70 may be further treated to remove liquid 25 entrapped therein. As the agglomerates 21 are of sands and clay, and the liquid 25 is a solvent for bitumen, the entrapped liquid 25 in the agglomerates 21 can conveniently be removed therefrom in a known manner such as, for example, by steam distillation, and the recovered liquid 25 may be recycled. The agglomerates 21, with entrapped liquid 25 removed therefrom, may be further heated to produce a strong sintered product.

The apparatus shown in FIG. 1 is ideally suited for the extraction of bitumen from Tar Sands, and is especially suited for Tar Sands containing a high clay content. As an example, high clay Tar Sands containing 23% particles of −325 mesh (Tyler) were fed at the rate of up to 20 lb/hr into a drum such as that designated 1 in FIG. 1 and having an end wall 4 with a diameter of 10 inches and a length of 15 inches, 10 lb/hr of Varsol (Trademark) was used as the solvent liquid 23, and 1 lb/hr of water adjusted to a pH of 9.5 with NaOH was used as the agglomerating liquid 18. Ball agglomerates ⅜ inch in diameter containing only 0.6% bitumen were obtained. The results of another test are given in the following table:

| CONTINUOUS AGGLOMERATION OF TAR SANDS | | | | | |
|---|---|---|---|---|---|
| IN | Weight lb/hr | Sand % | Water % | Bitumen % | Varsol % |
| Tar Sands Feed | 8.0 | 88.4 | 3.75 | 7.8 | — |
| Primary Water | 0.35 | — | 100 | — | — |
| Trimming Water | 0.15 | — | 100 | — | — |
| Varsol Wash | 6.5 | — | — | — | 100 |
| TOTAL WEIGHTS lb/hr | 15.0 | 7.1 | 0.8 | 0.62 | 6.5 |
| OUT | | | | | |
| Agglomerated Sands | 7.9 | 87.1 | 8.8 | 0.5 | 3.6 |
| Extracted Solvent | 7.1 | 2.5 | 1.1 | 8.2 | 88.2 |
| TOTAL WEIGHTS lb/hr | 15.0 | 7.1 | 0.8 | 0.62 | 6.5 |

Successful extractions of bitumen from Tar Sands, according to the present invention, have been carried out wherein all of the bitumen extraction occurs within the drum 1, that is Tar Sands 17 and agglomerating liquid 18 only are fed through the first port 6 into the drum 1, while all of the liquid 23 is fed through the second port 8 into the drum 1 and all of the extraction occurs within the drum interior 19. In this embodiment the agglomerating liquid 18 is preferably sprayed into the drum 1 at a portion of the interior 19 adjacent the first port 6.

Further, the apparatus according to the present invention can also be used as an adjunct to the known Hot Water process for extracting bitumen from Tar Sands, and is particularly useful therewith where high clay contents cause a great deal of difficulties. The presence of clay in tar sands treated by the Hot Water process leads to the formation of a so called middlings fraction, which consists of stable emulsion of oil and clay in water. In this embodiment the aqueous high clay middlings fraction from the Hot Water process would be used as the agglomerating liquid for untreated tar sands. The clay would agglomerate together with the fresh sand and the bitumen be extracted in the usual way.

In another embodiment of the present invention the drum 1 comprises at least two compartments having tapering interiors. Steel balls in the first compartment or compartments, into which the bituminous bearing material (e.g. Tar Sands) and agglomerant are fed, tumble with the bituminous bearing material to break it up and pass the broken up material in particulate form to the or each final compartment. The or each of the final compartments receive the extracting liquid so that bitumen is extracted from the bituminous bearing material in these compartments and the residue agglomerated therein in the manner shown and described with reference to the drum 1 shown in FIG. 1. In this embodiment a stirrer 52 and mixing vessel 50 may not be necessary because adequate mixing may be achieved by the steel balls.

Clearly it is not essential for the drum interior to taper in cross-sectional area for the whole length of the drum. In some instances it may be desirable for the drum to have end portions which are cylindrical. Further, it may be desirable in some instances for the drum side wall to slope along a curved path to provide the tapering drum interior.

We claim:
1. Apparatus for separating organic material from particulate Tar Sands and coal material and agglomerating the remaining particulate residue, comprising:
   a. a drum comprising a side wall which is annular in cross-section, with a substantial lengthwise portion of the cross-sectional area of the drum interior tapering longitudinally in a horizontal direction, an end wall extending across a larger end of the drum interior, a first port at a smaller end of the drum interior, and a second port in the end wall and horizontally spaced from the first port,
   b. drum mounting and rotating means mounting the drum so that an organic material separating liquid for the particulate material will overflow from the drum interior through the first port, and for rotating the drum about the longitudinal axis thereof so that residue agglomerates formed therein will overflow therefrom through the second port,
   c. conveying means, extending through the first port, for conveying the particulate material and a resi- due agglomerating liquid to an intermediate longitudinal portion of the drum interior, d. first liquid delivering means, for directing a particulate material slurry forming and organic material separating liquid, with which the agglomerating liquid is immiscible, into a portion of the drum interior adjacent the second port, and e. second liquid delivering means for directing a residue agglomerating liquid into a portion of the drum interior adjacent the first port.

2. Apparatus according to claim 1, which includes a stationary, agglomerate collector of arcuate cross-section extending through the second port, the agglomerate collector having a scoop extending in the direction of rotation of the drum for collecting agglomerates that tumble on to the collector as the drum rotates and for conveying said agglomerates out of said drum.

3. Apparatus according to claim 1, wherein a plurality of baffles are provided around the internal perimeter of the first port of the drum, for rotation with the drum, to retard the slurry from being carried out of the first port with liquid, the baffles being inclined in such a manner that their innermost ends trail their outermost ends in the direction of rotation of the drum.

4. Apparatus according to claim 1, which includes a plurality of ribs spaced circumferentially around the inner surface of the drum and extending along a major portion of the length of the drum and forming a roughened surface.

5. Apparatus according to claim 1, which includes a mixing vessel for mixing the particulate material and agglomerating liquid, a stirrer in the mixing vessel, and means for conveying the mixed material and agglomerating liquid to the first port.

6. Apparatus according to claim 5, which includes a screen adjacent the second port for conveying agglomerates overflowing through the second port from the drum interior, a vessel beneath the screen for collecting liquid draining therethrough, and means connected to the vessel for conveying liquid therefrom and spraying the liquid into the mixing vessel.

7. Apparatus according to claim 5, which includes liquid collecting means below the first port for collecting liquid flowing out of the drum through the first port, and means connected to the liquid collecting means for conveying liquid therefrom to the mixing vessel, and a liquid collecting vessel beneath liquid drainage holes in the means for conveying mixed material and agglomerating liquid to the first port.

* * * * *